(12) United States Patent
Kehrloesser et al.

(10) Patent No.: US 10,000,600 B2
(45) Date of Patent: Jun. 19, 2018

(54) METHOD FOR PRODUCING EMULSION POLYMERISATES

(71) Applicant: BASF SE, Ludwigshafen (DE)

(72) Inventors: Daniel Kehrloesser, Mannheim (DE); Joost Leswin, Mannheim (DE); Daniel Specker, Mannheim (DE); Konrad Roschmann, Ladenburg (DE); Matthias Gerst, Maikammer (DE); Harm Wiese, Laudenbach (DE)

(73) Assignee: BASF SE, Ludwigshafen (DE)

( * ) Notice: Subject to any disclaimer, the term of this patent is extended or adjusted under 35 U.S.C. 154(b) by 30 days.

(21) Appl. No.: 14/913,640

(22) PCT Filed: Aug. 18, 2014

(86) PCT No.: PCT/EP2014/067522
§ 371 (c)(1),
(2) Date: Feb. 22, 2016

(87) PCT Pub. No.: WO2015/024882
PCT Pub. Date: Feb. 26, 2015

(65) Prior Publication Data
US 2016/0208038 A1    Jul. 21, 2016

(30) Foreign Application Priority Data
Aug. 22, 2013  (EP) .................................... 13181399

(51) Int. Cl.
*C08F 265/06* (2006.01)
*C08F 285/00* (2006.01)
*C09D 151/00* (2006.01)
*B01J 13/16* (2006.01)
*C08F 265/04* (2006.01)

(52) U.S. Cl.
CPC ............. *C08F 265/06* (2013.01); *B01J 13/16* (2013.01); *C08F 285/00* (2013.01); *C09D 7/41* (2018.01); *C09D 151/003* (2013.01); *C08F 265/04* (2013.01); *C09D 7/42* (2018.01)

(58) Field of Classification Search
CPC ...................................................... C08F 265/06
See application file for complete search history.

(56) References Cited

U.S. PATENT DOCUMENTS

| | | | |
|---|---|---|---|
| 6,235,810 B1 | 5/2001 | Pavlyuchenko et al. | |
| 7,943,704 B2 * | 5/2011 | Roschmann | C08F 2/22 106/677 |
| 8,013,081 B2 | 9/2011 | Heuts et al. | |
| 2002/0065360 A1 | 5/2002 | Blankenship | |
| 2010/0063171 A1 | 3/2010 | Roschmann et al. | |
| 2012/0129965 A1 * | 5/2012 | Tuchbreiter | C08F 285/00 521/139 |

FOREIGN PATENT DOCUMENTS

| | | |
|---|---|---|
| DE | 25 01 123 | 7/1976 |
| DE | 10 2005 033516 | 1/2007 |
| EP | 0 915 108 A1 | 5/1999 |
| EP | 1 193 276 A2 | 4/2002 |
| EP | 1 904 544 | 4/2008 |
| EP | 2 511 312 A1 | 10/2012 |
| WO | 2011/009875 A1 | 1/2011 |

OTHER PUBLICATIONS

International Search Report dated Oct. 28, 2014 in PCT/EP14/67522 Filed Aug. 28, 2014.

* cited by examiner

*Primary Examiner* — Arrie L Reuther
(74) *Attorney, Agent, or Firm* — Oblon, McClelland, Maier & Neustadt, L.L.P.

(57) ABSTRACT

The present invention relates to a process for producing emulsion polymer particles having a core-shell structure, wherein the weight ratio of the shells is within specific limits, and also to their use in paints, paper coatings, foams and cosmetic compositions.

16 Claims, No Drawings

METHOD FOR PRODUCING EMULSION POLYMERISATES

This application is a National Stage of PCT/EP2014/067522, which was filed on Aug. 18, 2014. This application is based upon and claims the benefit of priority to European Application No. 13181399.0, which was filed on Aug. 22, 2013.

The present invention relates to a process for producing emulsion polymer particles having a core-shell structure, wherein the weight ratio of swell-seed (ii) to seed polymer (i) is in the range from 10:1 to 150:1, the weight ratio of the core stage polymer to first shell (iii) is in the range from 2:1 to 1:5, and the weight ratio of third shell (vii) to second shell (iv) is in the range from 1:2 to 1:10, and also to their use in paints, paper coatings, foams, crop protection agents, liquid inks and cosmetic compositions.

Hollow organic particles are a special kind of core-shell particles which, in dried form, consist of an air-filled void surrounded by a hard sheath. Owing to this construction, they have the special property of scattering light, explaining their use as white pigment in paints, paper coatings and cosmetic compositions, for example suncreams. When used therein they replace part of the inorganic white pigment titanium dioxide and also boost the effect of the remaining $TiO_2$.

C. J. McDonald and M. J. Devon, in Advances in Colloid and Interface Science 2002, 99, 181-213, describe various ways of forming these hollow particles such as inter alia swelling with organic solvents or propellants, encapsulation of hydrocarbons or approaches based on W/O/W emulsions. However, the method which is preferred for ecological as well as economic reasons is that of osmotically swelling specific core-shell particles.

EP 1 904 544 describes this process in fundamental terms, although the weight ratios of the shells differ from the process of the present invention. Polymers obtained by the process of the present invention exhibit a distinctly improved scattering efficiency. This is because, compared with the process disclosed in EP 1 904 544, more voidage is generated by the process of the present invention, based on the polymer solids. The magnitude of total voidage in the polymers due to the core-shell particles can be determined by means of an NMR method which is likewise described in the application, via the measured internal water content of the polymers. Polymers obtained by the process of the present invention have an internal water content of 20% or more, based on the entire water content of the dispersion. This leads to a distinctly higher whiteness.

EP 1 904 544 already demonstrated the advantage of swelling without stopping the free-radical flux versus EP 0 915 108, in which the free-radical flux is stopped by waiting until the added free-radical initiator has fully reacted, cooling the reaction solution or adding polymerization inhibitors and/or reducing agents. The process described according to the present invention likewise ensures that at the time of swelling there is a free-radical flux as well as a monomer concentration which is sufficient for swelling.

U.S. Pat. No. 8,013,081 likewise describes a process for producing hollow organic particles. However, the process described according to the present invention again differs in having fundamentally different weight ratios between the shells. Polymers obtained by the process of the present invention exhibit a distinctly improved scattering efficiency. This is because, compared with the process disclosed in U.S. Pat. No. 8,013,081, more voidage is generated by the process of the present invention. The magnitude of total voidage in the polymers due to the core-shell particles can be determined by means of an NMR method which is likewise described in the application, via the measured internal water content of the polymers.

EP 2 511 312 describes a process which eschews the use of polymerization inhibitor and of reducing agent and utilizes small amounts of free-radical initiators at the start of the first shell (similar to shell iii described in the process of the present invention) to enable swelling through plasticization with a monomer-solvent system comprising from 5 to 50 wt % of a monomer of the shell monomer system of the second shell (similar to shell iv described in the process of the present invention). The polymers obtained by the process of the present invention accordingly differ fundamentally in that during the swelling, described by steps v) and vi), no second shell iv) monomer is used for plasticization, but a plasticizer monomer having a ceiling temperature below 181° C., preferably below 95° C.

The problem addressed by the present invention—that of developing a production process for emulsion polymer particles, in particular for hollow organic particles having an improved whiteness compared with the prior art—was solved according to the present invention as follows:

A process for producing emulsion polymer particles by producing a multistaged emulsion polymer by
i) polymerizing in a sequential polymerization a seed,
ii) then reacting with a swell-seed comprising 55 to 99.9 wt % of one or more than one nonionic ethylenically unsaturated monomer and 0.1 to 45 wt % of one or more than one ethylenically unsaturated hydrophilic monomer, all based on the overall weight of the core stage polymer comprising both seed and swell-seed,
iii) then polymerizing a first shell comprising 85 to 99.9 wt % of one or more than one nonionic ethylenically unsaturated monomer and 0.1 to 15 wt % of one or more than one hydrophilic ethylenically unsaturated monomer,
iv) then polymerizing a second shell comprising 85 to 99.9 wt % of one or more than one nonionic ethylenically unsaturated monomer and 0.1 to 15 wt % of one or more than one hydrophilic ethylenically unsaturated monomer,
v) then adding at least one plasticizer monomer having a ceiling temperature below 181° C., preferably below 95° C.,
vi) neutralizing, to a pH of not less than 7.5, the resultant particles with a base,
vii) then polymerizing a third shell comprising 90 to 99.9 wt % of one or more than one nonionic ethylenically unsaturated monomer and 0.1 to 10 wt % of one or more than one hydrophilic ethylenically unsaturated monomer,
viii) and also optionally polymerizing one or more further shells comprising one or more than one nonionic ethylenically unsaturated monomer and one or more than one hydrophilic ethylenically unsaturated monomer, wherein the weight ratio of said swell-seed (ii) to said seed polymer (i) is in the range from 10:1 to 150:1, the weight ratio of the core stage polymer to said first shell (iii) is in the range from 2:1 to 1:5, and the weight ratio of said third shell (vii) to said second shell (iv) is in the range from 1:2 to 1:10.

The present invention further provides for the use of the emulsion polymers obtainable according to the present invention in paints, paper coatings, foams, crop protection agents, liquid inks or cosmetic compositions, and also paints, paper, foams, crop protection agents, liquid inks or cosmetic compositions comprising the emulsion polymers obtained according to the present invention.

One advantage of the invention is that the described change in the weight ratios between swell-seed (ii) and seed polymer (i), between the core stage polymer and the first shell (iii) and also in particular between the third shell (vii) and the second shell (iv) has the effect in relation to the prior art of the total voidage of the polymers being increased, which leads to a distinct improvement in whiteness, and thus overcomes this disadvantage of the prior art.

Polymers obtained by the process of the present invention have an internal water content of 20% to 40% or more, based on the entire water content of the dispersion. This leads to a distinctly higher whiteness.

The invention described is a multistaged sequential emulsion polymerization. Sequential relates to the implementation of the individual stages in that each individual stage may also be constructed of two or more sequential steps.

The term "seed" refers to an aqueous polymeric dispersion which is used at the start of the multistaged polymerization and is the product of an emulsion polymerization, or to an aqueous polymeric dispersion present at the end of one of the polymerization stages for producing the hollow particle dispersion, except the last stage.

The seed used at the start of polymerizing the first stage may also be formed in situ and preferably comprises as monomer constituents styrene, acrylic acid, methacrylic acid, esters of acrylic acid and methacrylic acid or mixtures thereof.

The average particle size of the seed polymer in the unswollen state is in the range from 20 to 100 nm.

The swell-seed comprises 55 to 99.9 wt %, preferably 60 to 80 wt %, of a nonionic ethylenically unsaturated monomer and 0.1 to 45 wt %, preferably 20 to 40 wt %, of an ethylenically unsaturated hydrophilic monomer.

The weight ratio of swell-seed (ii) to seed polymer (i) is in the range from 10:1 to 150:1. The average particle size in the unswollen state of the core stage polymer consisting of seed (i) and swell-seed (ii) is in the range from 50 to 300 nm, preferably in the range from 50 to 200 nm.

The glass transition temperature determined by the Fox equation (John Wiley & Sons Ltd., Baffins Lane, Chichester, England, 1997) of the core stage polymer in the protonated state is between −20° C. and 150° C.

Nonionic ethylenically unsaturated monomers are for example styrene, vinyltoluene, ethylene, butadiene, vinyl acetate, vinyl chloride, vinylidene chloride, acrylonitrile, acrylamide, methacrylamide, ($C_1$-$C_{20}$)alkyl or ($C_3$-$C_{20}$)alkenyl esters of acrylic or methacrylic acid, methacrylate, methyl methacrylate, ethyl acrylate, ethyl methacrylate, butyl acrylate, butyl methacrylate, 2-ethylhexyl acrylate, 2-ethylhexyl methacrylate, benzyl acrylate, benzyl methacrylate, lauryl acrylate, lauryl methacrylate, oleyl acrylate, oleyl methacrylate, palmityl acrylate, palmityl methacrylate, stearyl acrylate, stearyl methacrylate, hydroxyl-containing monomers, in particular $C_1$-$C_{10}$ hydroxyalkyl (meth)acrylates, such as hydroxyethyl (meth)acrylate, hydroxypropyl (meth)acrylate, glycidyl (meth)acrylate, preferably methyl methacrylate.

Ethylenically unsaturated hydrophilic monomers are for example acrylic acid, methacrylic acid, acryloyloxypropionic acid, methacryloyloxypropionic acid, acryloyloxyacetic acid, methacryloyloxyacetic acid, crotonic acid, aconitic acid, itaconic acid, monomethyl maleate, maleic acid, monomethyl itaconate, maleic anhydride, fumaric acid, monomethyl fumarate, itaconic anhydride, and also linseed oil fatty acids, such as oleic acid, linoleic acid and linolenic acid and also further fatty acids, such as ricinoleic acid, palmitoleic acid, elaidic acid, vaccenic acid, icosenic acid, cetoleic acid, erucic acid, nervonic acid, arachidonic acid, timnodonic acid, clupanodonic acid, preferably acrylic acid and methacrylic acid.

The first shell (iii) comprises 85 to 99.9 wt % of one or more than one nonionic ethylenically unsaturated monomer, preferably 90 to 99.9 wt %, and also 0.1 to 15 wt %, preferably 0.1 to 10 wt % of one or more than one hydrophilic ethylenically unsaturated monomer.

Nonionic ethylenically unsaturated monomers are for example styrene, vinyltoluene, ethylene, butadiene, vinyl acetate, vinyl chloride, vinylidene chloride, acrylonitrile, acrylamide, methacrylamide, ($C_1$-$C_{20}$)alkyl or ($C_3$-$C_{20}$)alkenyl esters of acrylic or methacrylic acid, methacrylate, methyl methacrylate, ethyl acrylate, ethyl methacrylate, butyl acrylate, butyl methacrylate, 2-ethylhexyl acrylate, 2-ethylhexyl methacrylate, benzyl acrylate, benzyl methacrylate, lauryl acrylate, lauryl methacrylate, oleyl acrylate, oleyl methacrylate, palmityl acrylate, palmityl methacrylate, stearyl acrylate, stearyl methacrylate, hydroxyl-containing monomers, in particular $C_1$-$C_{10}$ hydroxyalkyl (meth)acrylates, such as hydroxyethyl (meth)acrylate, hydroxypropyl (meth)acrylate, glycidyl (meth)acrylate, preferably styrene, acrylonitrile, methacrylamide, methacrylate, methyl methacrylate, ethyl acrylate, ethyl methacrylate, butyl acrylate, butyl methacrylate, 2-ethylhexyl acrylate, 2-ethylhexyl methacrylate.

Ethylenically unsaturated hydrophilic monomers are for example acrylic acid, methacrylic acid, acryloyloxypropionic acid, methacryloyloxypropionic acid, acryloyloxyacetic acid, methacryloyloxyacetic acid, crotonic acid, aconitic acid, itaconic acid, monomethyl maleate, maleic acid, monomethyl itaconate, maleic anhydride, fumaric acid, monomethyl fumarate, and also linseed oil fatty acids, such as oleic acid, linoleic acid and linolenic acid and also further fatty acids, such as ricinoleic acid, palmitoleic acid, elaidic acid, vaccenic acid, icosenic acid, cetoleic acid, erucic acid, nervonic acid, arachidonic acid, timnodonic acid, clupanodonic acid, preferably acrylic acid, methacrylic acid, itaconic acid, itaconic anhydride, monomethyl itaconate.

The first shell (iii) encloses the core stage polymer. The weight ratio of the core stage polymer to the first shell (iii) is in the range from 2:1 to 1:5 preferably 2:1 to 1:3, and the shell polymer in the protonated state has a glass transition temperature determined by the Fox equation between −60° C. to 120° C.

The particle size of this stage consisting of core stage polymer and first shell (iii) in the unswollen state is from 60 nm to 500 nm, preferably from 60 to 300 nm.

The second shell (iv) comprises 85 to 99.9, preferably 90 to 99.9 wt % of one or more than one nonionic ethylenically unsaturated monomer and 0.1 to 15 wt %, preferably 0.1 to 10 wt % of one or more than one hydrophilic ethylenically unsaturated monomer.

Nonionic ethylenically unsaturated monomers are for example styrene, p-methylstyrene, t-butylstyrene, vinyltoluene, ethylene, butadiene, vinyl acetate, vinyl chloride, vinylidene chloride, acrylonitrile, acrylamide, methacrylamide, ($C_1$-$C_{20}$)alkyl or ($C_3$-$C_{20}$)alkenyl esters of acrylic or methacrylic acid, methacrylate, methyl methacrylate, ethyl acrylate, ethyl methacrylate, butyl acrylate, butyl methacrylate, 2-ethylhexyl acrylate, 2-ethylhexyl methacrylate, benzyl acrylate, benzyl methacrylate, lauryl acrylate, lauryl methacrylate, oleyl acrylate, oleyl methacrylate, palmityl acrylate, palmityl methacrylate, stearyl acrylate, stearyl methacrylate, hydroxyl-containing monomers, in particular $C_1$-$C_{10}$ hydroxyalkyl (meth)acrylates, such as hydroxyethyl (meth)acrylate, hydroxypropyl (meth)acrylate, glycidyl (meth)acrylate, preferably styrene, acrylonitrile, methacrylamide, methacrylate, methyl methacrylate, ethyl acrylate, ethyl methacrylate, butyl acrylate, butyl methacrylate, 2-ethylhexyl acrylate, 2-ethylhexyl methacrylate.

Ethylenically unsaturated hydrophilic monomers are for example acrylic acid, methacrylic acid, acryloyloxypropionic acid, methacryloyloxypropionic acid, acryloyloxyacetic acid, methacryloyloxyacetic acid, crotonic acid, aconitic acid, itaconic acid, monomethyl maleate, maleic acid, monomethyl itaconate, maleic anhydride, fumaric acid, monomethyl fumarate, and also linseed oil fatty acids, such as oleic acid, linoleic acid and linolenic acid and also further fatty acids, such as ricinoleic acid, palmitoleic acid, elaidic acid, vaccenic acid, icosenic acid, cetoleic acid, erucic acid, nervonic acid, arachidonic acid, timnodonic acid, clupanodonic acid, preferably acrylic acid, methacrylic acid, itaconic acid, itaconic anhydride, monomethyl itaconate and linseed oil fatty acids.

The first shell is enveloped by the second shell and the weight ratio of the first shell (iii) to the second shell (iv) is in the range from 1:1 to 1:30, and the shell polymer in the protonated state has a Fox glass transition temperature of 50 to 120° C.

The average particle size of this stage, consisting of core stage polymer, first shell (iii) and second shell (iv), in the unswollen state is in the range from 70 to 1000 nm.

The plasticizer monomer recited under (v) is for example α-methylstyrene, esters of 2-phenylacrylic acid/atropic acid (e.g., methyl, ethyl, n-propyl, n-butyl), 2-methyl-2-butene, 2,3-dimethyl-2-butene, 1,1-diphenylethene or methyl 2-tert-butylacrylate, and also further monomers recited in J. Brandrup, E. H. Immergut, Polymer Handbook 3rd Edition, II/316ff. α-Methylstyrene is preferably used as plasticizer monomer.

When the polymerization is carried out in aqueous solution or dilution, the monomers may be wholly or partly neutralized with bases before or during the polymerization. Useful bases include for example alkali metal or alkaline earth metal compounds such as sodium hydroxide, potassium hydroxide, calcium hydroxide, magnesium oxide, sodium carbonate; ammonia; primary, secondary and tertiary amines, such as ethylamine, propylamine, monoisopropylamine, monobutylamine, hexylamine, ethanolamine, dimethylamine, diethylamine, di-n-propylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylamino-ethylamine, 2,3-diaminopropane, 1,2-propylenediamine, dimethylaminopropylamine, neopentanediamine, hexamethylenediamine, 4,9-dioxadodecane-1,12-diamine, polyethyleneimine, polyvinylamine or mixtures thereof.

The ethylenically unsaturated hydrophilic monomers used in (i)-(v) are preferably not neutralized before or during the polymerization.

The neutralization recited under (vi) is effected with one or more of the illustratively recited bases for swelling the core and hence leads to the formation of the hollow organic particle after drying.

It is preferable to use sodium hydroxide, ammonia, triethanolamine and diethanolamine for the neutralization recited under (vi).

The ethylenically unsaturated hydrophilic monomers used after (vi) are preferably neutralized during the polymerization.

The third shell (vii) comprises 90 to 99.9, preferably 95 to 99.9 wt % of one or more than one nonionic ethylenically unsaturated monomer and 0.1 to 10, preferably 0.1 to 5 wt % of one or more than one hydrophilic ethylenically unsaturated monomer.

The nonionic ethylenically unsaturated monomers are for example styrene, ethylvinylbenzene, vinyltoluene, ethylene, butadiene, vinyl acetate, vinyl chloride, vinylidene chloride, acrylonitrile, acrylamide, methacrylamide, $(C_1-C_{20})$alkyl or $(C_3-C_{20})$alkenyl esters of acrylic or methacrylic acid, methacrylate, methyl methacrylate, ethyl acrylate, ethyl methacrylate, butyl acrylate, butyl methacrylate, 2-ethylhexyl acrylate, 2-ethylhexyl methacrylate, benzyl acrylate, benzyl methacrylate, lauryl acrylate, lauryl methacrylate, oleyl acrylate, oleyl methacrylate, palmityl acrylate, palmityl methacrylate, stearyl acrylate, stearyl methacrylate, hydroxyl-containing monomers, in particular $C_1-C_{10}$ hydroxyalkyl (meth)acrylates, such as hydroxyethyl (meth)acrylate, hydroxypropyl (meth)acrylate, glycidyl (meth)acrylate, preferably styrene, acrylonitrile, methacrylamide, methacrylate, methyl methacrylate, ethyl acrylate, ethyl methacrylate, butyl acrylate, butyl methacrylate, 2-ethylhexyl acrylate, 2-ethylhexyl methacrylate.

The ethylenically unsaturated hydrophilic monomers are for example acrylic acid, methacrylic acid, acryloyloxypropionic acid, methacryloyloxypropionic acid, acryloyloxyacetic acid, methacryloyloxyacetic acid, crotonic acid, aconitic acid, itaconic acid, monomethyl maleate, maleic acid, monomethyl itaconate, maleic anhydride, fumaric acid, monomethyl fumarate, and also linseed oil fatty acids, such as oleic acid, linoleic acid and linolenic acid and also further fatty acids, such as ricinoleic acid, palmitoleic acid, elaidic acid, vaccenic acid, icosenic acid, cetoleic acid, erucic acid, nervonic acid, arachidonic acid, timnodonic acid, clupanodonic acid, preferably acrylic acid, methacrylic acid, itaconic acid, itaconic anhydride, monomethyl itaconate and linseed oil fatty acids.

The weight ratio of third to second shell is in the range from 1:2 to 1:10, and the shell polymer has a Fox glass transition temperature of 50 to 120° C.

When the polymers obtainable according to the present invention are used for painting, the average final particle size should be in the range from 100 to 600 nm, while it should be in the range from 200 to 2500 nm for use in paper and in cosmetics and in the range from 300 to 800 nm for foams.

In a paint, the pigments employed, specifically $TiO_2$, can be wholly or partly replaced by the polymeric dispersion described herein. Paints of this type typically comprise inter alia water, thickening agent, aqueous sodium hydroxide solution, pigment disperser, associative thickener, defoamer, biocide, binder and also film-forming assistant.

The hollow particle dispersion can also be used for similar applications in other coatings consisting of resinous condensation products, such as phenolates and aminoplasts based on urea-formaldehyde and melamine-formaldehyde. Use is similarly possible in further coatings based on water-dispersible alkyds, polyurethanes, polyesters, ethyl-vinyl acetates and also styrene-butadiene.

Using the organic pigments obtainable by the process of the present invention in paper coatings leads to an increase in paper gloss. This is attributable to the sheath which, unlike with inorganic pigments, is deformable under pressure. Paper print quality is also enhanced. Substituting the organic pigments described herein for inorganic pigments leads to a lower density for the coating and thus to paper of lighter weight.

In cosmetics, the organic pigments obtainable by the process of the present invention can be used for example in suncreams to boost the level of photoprotection. The extraordinary light-scattering properties serve to increase the probability of UV radiation being absorbed by UV-active substances in the suncream.

The organic pigments obtainable by the process of the present invention are further useful in foams, crop protection agents, thermoplastic molding compounds and liquid inks.

The polymers are obtainable via customary methods of emulsion polymerization. It is preferable to operate in the absence of oxygen, more preferably in a stream of nitrogen. Customary apparatus is employed for the polymerization procedure, examples being stirred tanks, stirred-tank cascades, autoclaves, tubular reactors and kneaders. The polymerization can be carried out in solvent or diluent media, e.g., toluene, o-xylene, p-xylene, cumene, chlorobenzene, ethylbenzene, technical-grade mixtures of alkylaromatics, cyclohexane, technical-grade aliphatics mixtures, acetone, cyclohexanone, tetrahydrofuran, dioxane, glycols and glycol derivatives, polyalkylene glycols and derivatives thereof, diethyl ether, tert-butyl methyl ether, methyl acetate, isopropanol, ethanol, water or mixtures such as, for example, isopropanol-water mixtures.

The polymerization can be carried out at temperatures of 20 to 300, preferably of 50 to 200° C.

The polymerization is preferably carried out in the presence of compounds that form free radicals. These compounds are needed in a proportion of up to 30, preferably 0.05 to 15, more preferably 0.2 to 8 wt %, based on the monomers used in the polymerization. In the case of multicomponent initiator systems (e.g., redox initiator systems), the foregoing weight particulars are based on total components.

Useful polymerization initiators include, for example, peroxides, hydroperoxides, peroxodisulfates, percarbonates, peroxyesters, hydrogen peroxide and azo compounds. Examples of initiators, which can be water soluble or else water insoluble, are hydrogen peroxide, dibenzoyl peroxide, dicyclohexyl peroxydicarbonate, dilauroyl peroxide, methyl ethyl ketone peroxide, di-tert-butyl peroxide, acetylacetone peroxide, tert-butyl hydroperoxide, cumene hydroperoxide, tert-butyl perneodecanoate, tert-amyl perpivalate, tert-butyl perpivalate, tert-butyl perneohexanoate, tert-butyl per-2-ethyl hexanoate, tert-butyl perbenzoate, lithium peroxodisulfate, sodium peroxodisulfate, potassium peroxodisulfate, ammonium peroxodisulfate, azobisisobutyronitrile, 2,2'-azobis(2-amidinopropane) dihydrochloride, 2-(carbamoylazo)isobutyronitrile and 4,4-azobis(4-cyanovaleric acid).

The initiators may be used alone or mixed with each or one another, for example mixtures of hydrogen peroxide and sodium peroxodisulfate. Polymerization in an aqueous medium preferably utilizes water-soluble initiators.

The familiar redox initiator systems can also be used as polymerization initiators. Redox initiator systems of this type comprise one or more than one peroxide-containing compound combined with a redox co-initiator, e.g., sulfur compounds having a reducing effect, examples being bisulfites, sulfites, sulfinates, thiosulfates, dithionites and tetrathionates of alkali metals and ammonium compounds and their adducts such as sodium hydroxymethylsulfinates and acetone bisulfites and also ascorbic acid, isoascorbic acid and sodium erythrobate. Combinations of peroxodisulfates with alkali metal or ammonium hydrogensulfites can accordingly be used, an example being ammonium peroxodisulfate combined with ammonium disulfite. The ratio of peroxide-containing compound to redox co-initiator is in the range from 30:1 to 0.05:1.

Transition metal catalysts may additionally be used in combination with the initiators and/or the redox initiator systems, examples being salts of iron, cobalt, nickel, copper, vanadium and manganese. Useful salts include, for example, iron(II) sulfate, cobalt(II) chloride, nickel(II) sulfate, copper (I) chloride or else water-soluble iron-chelate complexes such as K[Fe-III-EDTA] or Na[Fe-III-EDTA][DK1]. Based on monomers, the reducing transition metal salt is used in a concentration of 0.1 ppm to 1000 ppm. Combinations of hydrogen peroxide with iron(II) salts can accordingly be used, an example being 0.5 to 30% of hydrogen peroxide being combined with 0.1 to 500 ppm of Mohr's salt.

Similarly, polymerization in organic solvents may combine the abovementioned initiators with redox co-initiators and/or transition metal catalysts, examples being benzoin, dimethylaniline, ascorbic acid and also organosoluble complexes of heavy metals, such as copper, cobalt, iron, manganese, nickel and chromium. The customarily used amounts of redox co-initiators and/or transition metal catalysts are here customarily about 0.1 to 1000 ppm, based on the amounts of monomers used.

When the reaction mixture is incipiently polymerized at the lower limit of the temperature range for the polymerization and then fully polymerized at a higher temperature, it is advantageous to use two or more different initiators that decompose at different temperatures, so an adequate concentration of free radicals is available within every temperature interval, or to use a redox initiator system wherein the peroxide-containing component is initially activated by a co-initiator at a low temperature and thermally decomposes at a higher temperature without a continued need for co-initiator.

The initiator can also be added in stages, and/or the rate of initiator addition varied over time.

To obtain polymers of low average molecular weight, it is often advantageous to conduct the copolymerization in the presence of chain transfer agents. The chain transfer agents used for this may be customary chain transfer agents, for example organic SH-containing compounds, such as 2-mercaptoethanol, 2-mercaptopropanol, mercaptoacetic acid, tert-butyl mercaptan, n-octyl mercaptan, n-dodecyl mercaptan and tert-dodecyl mercaptan, $C_1$-$C_4$ aldehydes, such as formaldehyde, acetaldehyde, propionaldehyde, hydroxylammonium salts such as hydroxylammonium sulfate, formic acid, sodium bisulfite, hypophosphorous acid and/or salts thereof, or isopropanol. Chain transfer agents are generally used in amounts of 0.1 to 20 wt %, based on the monomers. The choice of a suitable solvent is another way to control the average molecular weight. Thus, polymerization in the presence of diluents having benzylic hydrogen atoms, or in the presence of secondary alcohols such as, for example, isopropanol, leads to a reduction in the average molecular weight through chain transfer.

Polymers of low or comparatively low molecular weight are also obtained through: varying the temperature and/or the initiator concentration and/or the monomer feed rate.

To obtain comparatively high molecular weight copolymers, it is often advantageous to perform the polymerization in the presence of crosslinkers. These crosslinkers are compounds having two or more ethylenically unsaturated groups, for example diacrylates or dimethacrylates of at least dihydric saturated alcohols, e.g., ethylene glycol diacrylate, ethylene glycol dimethacrylate, 1,2-propylene glycol diacrylate, 1,2-propylene glycol dimethacrylate, 1,4-butanediol diacrylate, 1,4-butanediol dimethacrylate, hexanediol diacrylate, hexanediol dimethacrylate, neopentylglycol diacrylate, neopentylglycol dimethacrylate, 3-methylpentanediol diacrylate and 3-methylpentanediol dimethacrylate. The acrylic and methacrylic esters of alcohols having more than 2 OH groups can also be used as crosslinkers, examples being trimethylolpropane triacrylate or trimethylolpropane trimethacrylate. A further class of crosslinkers comprises diacrylates or dimethacrylates of polyethylene glycols or polypropylene glycols having molecular weights of 200 to 9000 in each case. Polyethylene and/or polypropylene glycols used for preparing the diacrylates or dimethacrylates preferably have a molecular weight of 400 to 2000 each. Not only the homopolymers of ethylene oxide and/or propylene oxide can be used, but also block copolymers of ethylene oxide and propylene oxide, or random copolymers of ethylene oxide and propylene oxide, which comprise a random distribution of the ethylene oxide and propylene oxide units. Similarly, the oligomers of ethylene oxide and/or propylene oxide are useful for preparing the crosslinkers, examples being diethylene glycol diacrylate, diethylene glycol dimethacrylate, triethylene glycol diacrylate, triethylene glycol dimethacrylate, tetraethylene glycol diacrylate and/or tetraethylene glycol dimethacrylate.

Useful crosslinkers further include vinyl acrylate, vinyl methacrylate, vinyl itaconate, divinyl adipate, butanediol divinyl ether, trimethylolpropane trivinyl ether, allyl acrylate, allyl methacrylate, methylallyl methacrylate, diallyl phthalate, triallyl isocyanurate, pentaerythritol triallyl ether, triallylsucrose, pentaallylsaccharose, pentaallylsucrose, methylenebis(meth)-acrylamide, divinylethylene urea, divinylpropylene urea, divinylbenzene, divinyldioxane, triallyl cyanurate, tetraallylsilane, tetravinylsilane and bis- or polyacryloylsiloxanes (e.g., Tegomers® from Evonik Industries AG).

Crosslinkers are preferably used in amounts of 0.1 to 70 wt %, based on the monomers to be polymerized in any one stage. Crosslinkers may be added in every stage.

It may further be advantageous to stabilize the monomer droplets and/or polymer particles with interface-active auxiliary materials. Emulsifiers or protective colloids are typically used for this purpose. Anionic, nonionic, cationic and amphoteric emulsifiers can be used. Anionic emulsifiers include, for example, alkylbenzenesulfonic acids, alkaline earth metal alkylbenzenesulfonates, sulfonated fatty acids, sulfonated olefins, sulfonated diphenyl ethers, sulfosuccinates, fatty alcohol sulfates, alkylphenol sulfates, alkyl polyglycol ether sulfates, fatty alcohol ether sulfates, fatty alcohol phosphates, alkylphenol phosphates, alkyl polyglycol ether phosphates, alkyl polyalkylene oxide phosphates, and fatty alcohol ether phosphates. Useful nonionic emulsifiers include, for example, alkylphenol ethoxylates, polysiloxane polyalkylene oxide copolymers, primary alcohol ethoxylates, fatty acid ethoxylates, alkanolamide ethoxylates, fatty amine ethoxylates, EO-PO block copolymers and alkylpolyglucosides. Useful cationic and/or amphoteric emulsifiers include for example: quaternized aminoalkoxylates, alkylbetaines, alkylamidobetaines and sulfobetaines.

Typical protective colloids include, for example, cellulose derivatives, polyethylene glycol, polypropylene glycol, copolymers of ethylene glycol and propylene glycol, polyvinyl acetate, polyvinyl alcohol, polyvinyl ether, starch and starch derivatives, dextran, polyvinylpyrrolidone, polyvinylpyridine, polyethyleneimine, polyvinylimidazole, polyvinylsuccinimide, polyvinyl-2-methylsuccinimide, polyvinyl-1,3-oxazolid-2-one, polyvinyl-2-methylimidazoline and maleic acid and/or maleic anhydride copolymers as described for example in DE 2 501 123.

Preference is given to using alkaline earth metal alkylbenzenesulfonates, alkyl polyglycol ether sulfates and polysiloxane-polyalkylene oxide copolymers.

Based on the weight of the core stage polymer, emulsifiers or protective colloids are customarily used in concentrations of 0.05 to 20 wt %, preferably in concentrations of 0.1 to 5 wt %. In the further shells, emulsifiers or protective colloids are customarily used in concentrations of 0.05 to 20 wt %, preferably in concentrations of 0.1 to 5 wt %, based on the monomers to be polymerized in this stage.

The polymerization may be carried out in a batch or continuous manner in any one of a multiplicity of versions. Customarily, some of the monomer is initially charged, optionally in a suitable diluent or solvent and optionally in the presence of an emulsifier, of a protective colloid or of further auxiliary materials, inertized and heated to the desired polymerization temperature. However, the initial charge may also merely comprise a suitable diluent. The free-radical initiator, further monomer and other auxiliary materials, e.g., chain transfer agents or crosslinkers are each optionally added in a diluent within a defined period of time. Feed times may be chosen to differ in length. For instance, a longer feed time may be chosen for the initiator feed than for the monomer feed.

When the polymer is produced in a steam-volatile solvent or solvent mixture, the solvent may be removed by introduction of steam in order that an aqueous solution or dispersion may be obtained in this way. The polymer may also be separated from the organic diluent via a drying operation.

The process of the present invention delivers a distinctly higher scattering efficiency in paints and hence a distinct improvement in whiteness and also particles having a distinctly larger voidage (internal water). The whiteness of the core-shell particles obtained according to the process of the present invention is ≥78. The proportion of internal water is in a range between 20% and 40%.

The present invention further provides for the use of the polymer dispersions obtainable according to the present invention in paints, paper coatings, foams, crop protection agents, liquid inks, thermoplastic molding compounds and cosmetic compositions, preferably in paints.

The present invention further provides a paint in the form of an aqueous composition comprising
    at least one emulsion polymer particle according to the present invention, as defined above,
    at least one filming polymer,
    optionally (in)organic filler and/or optionally further (in)organic pigments,
    optionally at least one customary auxiliary, and water.

Optionally useful filming polymers include aqueous emulsion polymers based on purely acrylate polymers and/or styrene-acrylate polymers, and also any further filming polymers for coatings consisting of resinous condensation products comprising phenolates and aminoplasts and also comprising urea-formaldehyde and melamine-formaldehyde. It is similarly possible to use further polymers based on water-dispersible alkyds, polyurethanes, polyesters, ethyl-vinyl acetates and also styrene-butadiene.

The emulsion polymer particles of the present invention are preferably employed in aqueous paints. Suitable fillers in clearcoat systems include, for example, matting agents to thus substantially reduce gloss in a desired manner. Matting agents are generally transparent and may be not only organic but also inorganic. Inorganic fillers based on silica are most suitable and are widely available commercially. Examples are the Syloid® brands of W. R. Grace & Company and the Acematt® brands of Evonik Industries AG. Organic matting agents are for example available from BYK-Chemie GmbH under the Ceraflour® and the Ceramat® brands, from Deuteron GmbH under the Deuteron MK® brand. Suitable fillers for emulsion paints further include aluminosilicates, such as feldspars, silicates, such as kaolin, talc, mica, magnesite, alkaline earth metal carbonates, such as calcium carbonate, for example in the form of calcite or chalk, magnesium carbonate, dolomite, alkaline earth metal sulfates, such as calcium sulfate, silicon dioxide, etc. The preference in the paints is naturally for finely divided fillers. The fillers can be used as individual components. In practice, however, filler mixtures have been found to be particularly advantageous, examples being calcium carbonate/kaolin and calcium carbonate/talc. Gloss paints generally include only minimal amounts of very finely divided fillers or contain no fillers at all.

Finely divided fillers can also be used to enhance the hiding power and/or to economize on white pigments. Blends of fillers and color pigments are preferably used to control the hiding power of the hue and of the depth of shade.

Suitable pigments include, for example, inorganic white pigments such as titanium dioxide, preferably in the rutile form, barium sulfate, zinc oxide, zinc sulfide, basic lead carbonate, antimony trioxide, lithopone (zinc sulfide+barium sulfate) or colored pigments, for example iron oxides, carbon black, graphite, zinc yellow, zinc green, ultramarine, manganese black, antimony black, manganese violet, Prussian blue or Parisian green. In addition to inorganic pigments, the emulsion paints of the present invention may also comprise organic color pigments, for example sepia, gamboge, Cassel brown, toluidine red, parared, Hansa yellow, indigo, azo dyes, anthraquinonoid and indigoid dyes and also dioxazine, quinacridone, phthalocyanine, isoindolinone and metal-complex pigments. Also useful are the Luconyl® brands from BASF SE, e.g., Lyconyl® yellow, Luconyl® brown and Luconyl® red, especially the transparent versions.

The coating composition (aqueous paint) of the present invention, in addition to the polymer dispersion, may optionally comprise additional filming polymers, pigment and further auxiliaries.

Customary auxiliaries include wetting or dispersing agents, such as sodium polyphosphate, potassium polyphosphate, ammonium polyphosphate, alkali metal and ammonium salts of acrylic acid copolymers or of maleic anhydride copolymers, polyphosphonates, such as sodium 1-hydroxyethane-1,1-diphosphonate and also naphthalenesulfonic acid salts, in particular their sodium salts.

More importance attaches to the film-forming assistants, the thickeners and defoamers. Suitable film-forming assistants include, for example, Texanol® from Eastman Chemicals and the glycol ethers and esters as are commercially available for example from BASF SE, under the names Solvenon® and Lusolvan®, and from Dow Chemicals under the tradename Dowanol®. The amount is preferably <10 wt % and more preferably <5 wt %, based on overall formulation. It is also possible to formulate entirely without solvents.

Suitable auxiliaries further include flow control agents, defoamers, biocides and thickeners. Useful thickeners include, for example, associative thickeners, such as polyurethane thickeners. The amount of thickener is preferably less than 2.5 wt %, more preferably less than 1.5 wt % of thickener, based on paint solids content. Further directions regarding the formulation of wood paints are described at length in "water-based acrylates for decorative coatings" by the authors M. Schwartz and R. Baumstark, ISBN 3-87870-726-6.

The paints of the present invention are obtained in known manner by blending the components in customary mixers. A tried and tested procedure is to first prepare an aqueous paste or dispersion from the pigments, water and optionally the auxiliaries and only then to mix the polymeric binder, i.e., generally the aqueous dispersion of the polymer, with the pigment paste or, respectively, dispersion.

The paint of the present invention can be applied to substrates in a conventional manner, e.g., by brushing, spraying, dipping, rolling or knifecoating.

The paints of the present invention are notable for ease of handling and good processing characteristics, and also for a high level of whiteness. The paints have a low noxiant content. They have good performance characteristics, for example good fastness to water, good adherence in the wet state, and good block resistance, good recoatability, and they exhibit good flow on application. The equipment used is easily cleaned with water.

The examples which follow are offered by way of elucidation, not limitation of the present invention.

Experimental Methods

Determination of Glass Transition Temperature

Glass transition temperatures were determined by theoretical computation as per the Fox equation (John Wiley & Sons Ltd., Baffins Lane, Chichester, England, 1997), where the value for the protonated state of the acid is assumed for the glass transition temperature of monomers having a carboxylic acid function.

$1/T_g = W_a/T_{ga} + W_b/T_{gb}$, where $T_{ga}$ and $T_{gb}$=glass transition temperature of polymers "a" and "b"

$W_a$ and $W_b$=weight fraction of polymers "a" and "b"

Measurement of Particle Size

Particle sizes were determined by hydrodynamic fractionation using a Polymer Labs particle size distribution analyzer (PSDA). The Cartridge PL0850-1020 column used was operated with a flow rate of 2 ml·min$^{-1}$. The samples were diluted with eluent solution down to an absorption of 0.03 AU·μl$^{-1}$.

The sample is eluted by the size exclusion principle according to the hydrodynamic diameter. The eluent comprises 0.2 wt % of dodecylpoly(ethylene glycol ether)$_{23}$, 0.05 wt % of sodium dodecylsulfonate, 0.02 wt % of sodium dihydrogen phosphate and 0.02 wt % of sodium azide in deionized water. The pH is 5.8. The elution time is calibrated with polystyrene calibration lattices. The measurement range extends from 20 nm to 1200 nm. Detection is by UV detector at wavelength 254 nm.

Particle size can further be determined using a Coulter M4+ Particle Analyzer or by photon correlation spectroscopy also known as quasi elastic light scattering or dynamic light scattering (DIN ISO 13321:2004-10) using a Malvern high performance particle sizer (HPPS).

Procedure for Whiteness Measurement

A 6 g quantity of the hereinbelow described color paste and 0.312 g based on solids of the hollow particle dispersion are weighed out into a vessel, the mixture is homogenized without stirring air thereinto. A 200 μm knife coater is used to draw down a film of this mixture on a black polymeric foil (matte option, article No. 13.41 EG 870934001, Bernd Schwegmann GmbH & Co. KG, D) at a speed of 0.9 cm/sec. The samples are dried at 23° C. and a relative humidity of 40-50% for 24 h. Subsequently, a Minolta CM-508i spectrophotometer is used to measure the whiteness (L value from L a b color space to EN ISO 11664-4:2012-06) at three different places. The places where the measurements were carried out are marked in order that a micrometer screw may subsequently be used to determine the corresponding thicknesses of the colored-film layer by differential measurement relative to the uncoated polymeric foil. After computing an average film thickness and also an average whiteness from the three individual measurements, the whiteness level obtained is finally standardized to a dry film thickness of 50 μm by linear extrapolation. The calibration needed for this was done by measuring the whiteness of a standard hollow particle dispersion in a dry film thickness range of about 30-60 μm.

Preparation of Color Paste

A vessel is initially charged with 185 g of water and subsequently with the following ingredients, added in the stated order under a dissolver at about 1000 rpm and stirred homogeneous for altogether about 15 minutes: 2 g of 20 wt % aqueous sodium hydroxide solution, 12 g of Pigmentverteiler® MD 20 pigment disperser (copolymer of maleic acid and diisobutylene from BASF SE), 6 g of Agitan® E 255 (siloxane defoamer from Münzing Chemie GmbH), 725 g of Acronal® A 684 (binder, 50 wt % dispersion from BASF SE), 40 g of Texanol® (film-forming assistant from Eastman Chemical Company), 4 g of Agitan® E 255 (siloxane defoamer from Münzing Chemie GmbH), 25 g of DSX 3000 (30 wt %, associative thickener: hydrophobic modified polyether (HMPE)) and 2 g of DSX 3801 (45 wt %, associative thickener: hydrophobic modified ethoxylated urethane (HEUR)).

Determination of Internal Water Content

The relative internal water content, i.e., the fraction of the water population in the interior of the core shell particles based on the overall water content of the sample, can be described via a pulsed-field-gradient nuclear-magnetic resonance (PFG-NMR) $^1$H NMR experiment. In a system where the internal and external water populations are subject to diffusive exchange, exact determination is possible by varying the diffusion times according to Kärger (Annalen der Physik, series 7, volume 27, issue 1, 1971, pp. 107-109). A linear approximation to this exchange model is possible in the region for which the effective diffusion time Δ of the PFG-NMR signal attenuation is very much smaller than the exchange time between the reservoirs. In the system described, this is for example the case with Δ varying between 7 and 10 ms, for which the actual internal water content can be determined from the extrapolation to 0 ms. One prerequisite is that sufficiently strong gradient fields are available. In the case of exchange times being similar, a comparison of the internal water content can also be approximated via a comparison of measurements at a single, short diffusion time. In the present case, the comparisons between similar polymers were carried out with a diffusion time of Δ=7 ms by varying the gradient field strengths g up to 800 G/cm for an effective gradient pulse duration δ=1 ms by using a stimulated gradient echo pulse sequence (Steijskal & Tanner, J. Chem. Phys., 1965, Vol. 42, pp. 288ff) on a commercially available high field NMR system (Bruker Biospin, Rheinstetten/Germany). The water signal was integrated from 5.8 to 3.7 ppm relative to the water signal maximum referenced internally to 4.7 ppm. The relative signal contributions by internal and external water were derived from the prefactors of a bi-exponential fit to the gradient-dependent PFG-NMR signal drop-off, with the sum total of the two prefactors being standardized. The fitted effective diffusion coefficients in our example were on the order of $2 \times 10^{-9}$ m$^2$/s for external water and $5 \times 10^{-12}$ m$^2$/s for internal water. The error associated with the determination of the internal water content was about 1% based on 100% overall water content.

EXAMPLES

Production of Core-Shell Particles

Organic raw materials not in the form of an aqueous solution were all purified by distillation prior to the synthesis.

Example 1

Seed Dispersion A1:

A pre-emulsion was prepared from 123.85 g of water, 0.88 g of Disponil® LDBS 20 (sodium dodecylbenzene sulfonate (20% strength)), 182 g of n-butyl acrylate, 163.45 g of methyl methacrylate and 4.55 g of methacrylic acid. The initial charge, consisting of 1172.5 g of water, 70 g of Disponil® LDBS 20 and also 22.19 g of the pre-emulsion, in a polymerization vessel equipped with an anchor stirrer, a reflux condenser and two feed vessels was heated in a nitrogen atmosphere to a temperature of 80° C. and incipiently polymerized for 15 min by addition of 67.2 g of a 2.5 wt % sodium peroxodisulfate solution. Thereafter, the rest of pre-emulsion was metered in at 80° C. over 60 min. This was followed by further polymerization for 15 min and cooling down to 55° C. over 20 min. To deplete the residual monomers, 3.5 g of a 10 wt % aqueous tert-butyl hydroperoxide solution and also 2.19 g of a 10 wt % aqueous Rongalit® C (sodium hydroxymethylsulfonate) solution were then added to the reaction mixture, which was stirred for one hour and then cooled down to 30° C., at which point 4.38 g of 25 wt % aqueous ammonia solution were added to adjust the pH of the dispersion.

Solids content: 19.8%
Particle size (PSDA, volume median): 34 nm

Dispersion B1 (Swell-Core)

The initial charge, consisting of 1958.8 g of water and 14.54 g of seed dispersion A1, in a polymerization vessel equipped with an anchor stirrer, reflux condenser and two feed vessels was heated in a nitrogen atmosphere to a temperature of 82° C. Two minutes after addition of 26.68 g of a 7 wt % sodium peroxodisulfate solution, a mixture of 0.62 g of allyl methacrylate and 217.34 g of methyl methacrylate and a solution of 9.34 g of Lutensit® A-EP A (alkyl polyalkylene oxide phosphates (20% strength)), 9.34 g of Disponil® LDBS 20 and 166 g of methacrylic acid in 562 g of water were added concurrently over 90 min. Ten minutes after completion of the addition, 92.55 g of a 1.5 wt % sodium peroxodisulfate solution, a mixture of 62 g of n-butyl methacrylate and 345.86 g of methyl methacrylate and also a solution of 2.49 g of Disponil® LDBS 20 and 8.38 g of methacrylic acid in 276.89 g of water were added concurrently over 75 min. Finally, the feed vessel was rinsed with 33 g of water and polymerization was continued for a further 30 min.

Solids content: 21.8%
pH: 3.5
Particle size (PSDA, volume median): 186 nm

Dispersion C1

The initial charge, consisting of 261 g of water and 273.21 g of dispersion B1, in a polymerization vessel equipped with an anchor stirrer, a reflux condenser and two feed vessels was heated in a nitrogen atmosphere to a temperature of 81° C. Addition of 25.2 g of a 1.4 wt % sodium peroxodisulfate solution was followed by the metered addition over 120 min of pre-emulsion 1, consisting of 132 g of water, 13.6 g of Disponil® LDBS 20, 4.08 g of methacrylic acid, 17.2 g of methyl methacrylate, 10.88 g of acrylonitrile, 3.4 g of allyl methacrylate and 202.84 g of styrene, together with 24.32 g of a 2.5 wt % sodium peroxodisulfate solution. On completion of the additions, 3.36 g of a 2.5 wt % sodium peroxodisulfate solution were added and the internal temperature was raised to 92° C. over 40 min. Then, 23.76 g of α-methylstyrene were added over 10 min and the feed rinsed with 40.5 g of water. After a further 20 min of stirring 32 g of a 10 wt % ammonia solution were metered in over 5 min and stirred in for 5 min. This was followed by the metered addition within 15 min of pre-emulsion 2, consisting of 98.44 g of water, 7 g of Disponil® LDBS 20, 0.28 g of methacrylic acid and 78 g of divinylbenzene (65% strength in ethylvinylbenzene). Completion of the addition was followed five minutes later by the addition of 5.64 g of a 10 wt % aqueous solution of tert-butyl hydroperoxide and the metering over 20 min of 31 g of a 3 wt % aqueous Rongalit C solution. 30 minutes after completion of the addition a further 9.16 g of a 10 wt % aqueous solution of tert-butyl hydroperoxide and 8.52 g of a 5.1 wt % aqueous Rongalit C® solution were added concurrently by metered addition over 60 min.

Solids content: 29.7%
pH: 9.5
Particle size (PSDA, volume median): 389 nm
Whiteness: 79
Internal water: 24%

Example 2

Dispersion B2 (Swell-Core)

The initial charge, consisting of 526 g of water, in a polymerization vessel equipped with an anchor stirrer, a reflux condenser and two feed vessels was heated in a nitrogen atmosphere to a temperature of 82° C. After admixing a solution of 76 g of water, 1.41 g of Disponil® FES 993 (alkyl polyglycol ether sulfates (30% strength)) and 10.96 of EFKA® 3031 (polysiloxane polyalkylene oxide copolymers) and waiting for the temperature of the solution to return to 82° C., pre-emulsion 1 (consisting of 15.62 g of water, 0.28 g of Disponil® FES 993, 28.66 g of methyl methacrylate and 0.34 g of methacrylic acid) and 11.43 g of a 10 wt % sodium peroxodisulfate solution were admixed in succession before polymerizing for 30 min during which the temperature within the polymerization vessel was adjusted to 85° C. Thereafter, pre-emulsion 2 (consisting of 236 g of water, 18.63 g of Disponil® FES 993, 250 g of methyl methacrylate and 144.31 g of methacrylic acid) was metered in at 85° C. over 120 min. Finally, the feed vessel was rinsed with 10 g of water and polymerization was continued for a further 15 min.

Solids content: 33.2%
pH: 3.6
Particle size (PSDA, volume median): 130 nm

Dispersion C2

The initial charge, consisting of 429 g of water and 80.13 g of dispersion B2 in a polymerization vessel equipped with an anchor stirrer, a reflux condenser and two feed vessels was heated in a nitrogen atmosphere to a temperature of 78° C. and, following admixture of 18 g of a 2.5 wt % sodium peroxodisulfate solution, incipiently polymerized for 5 min. Then pre-emulsion 1 (consisting of 30 g of water, 3 g of Disponil® LDBS 20, 2.7 g of methacrylic acid, 23.8 g of methyl methacrylate and 34 g of styrene) was added over 60 min together with 36 g of a 2.5 wt % sodium peroxodisulfate solution, starting at 78° C.; the internal temperature was raised to 80° C. during the addition. On completion of the additions, pre-emulsion 2 (consisting of 118 g of water, 7 g of Disponil® LDBS 20, 2 g of linseed oil fatty acids, 0.9 g of allyl methacrylate and 296.1 g of styrene) was added over 75 min together with 9 g of a 2.5 wt % sodium peroxodisulfate solution, starting at 80° C.; during the feed the internal temperature was raised to 82° C. On completion of the feeds the internal temperature was raised to 93° C. and the system was stirred for 15 min before 18 g of α-methylstyrene were added. After a further 40 min of stirring, the temperature was lowered to 87° C. On attaining the temperature, the system was stirred for 15 min before 228 g of a 1.7 wt % ammonia solution were added over 30 min. After a renewed 15 min of stirring, pre-emulsion 3 (consisting of 51 g of water, 1.2 g of Disponil LDBS 20, 0.2 g of methacrylic acid and 41.8 g of divinylbenzene) was added over 30 min. Five minutes after completion of the addition 6 g of a 10 wt % aqueous solution of tert-butyl hydroperoxide were admixed together with 25 g of water, while 31 g of a 3.3 wt % aqueous Rongalit C® solution were added over 60 min.

Solids content: 28.9%
pH: 10.2
Particle size (PSDA, volume median): 387 nm
Whiteness: 80
Internal water: 25%

Comparative Example

Dispersion BV1 (Swell-Core)

The initial charge, consisting of 986 g of water and 28.2 g of Acronal® A508, in a polymerization vessel equipped with an anchor stirrer, a reflux condenser and two feed vessels was heated in a nitrogen atmosphere to a temperature of 82° C. and, following admixture of 20.9 g of a 2.5% sodium peroxodisulfate solution, incipiently polymerized for 5 min. Then pre-emulsion 1 (consisting of 161 g of water, 2.20 g of Disponil® LDBS 20, 13.70 g of Lutensit® A-EP A, 0.07 g of tert-dodecyl mercaptan, 136.3 g of methyl methacrylate, 0.66 g of allyl methacrylate and 68.3 g of methacrylic acid) was added over 70 min at 82° C. On completion of the addition 2.9 g of a 2.5% sodium peroxodisulfate solution were added and the system was stirred for 5 min. Thereafter pre-emulsion 2 (consisting of 167 g of water, 1.76 g of Disponil® LDBS 20, 110 g of methyl methacrylate, 13.5 g of n-butyl acrylate and 1.35 g of methacrylic acid) was added over 70 min at 82° C. together with 12 g of a 2.5% sodium peroxodisulfate solution. The system was finally postpolymerized for a further 30 min.

Solids content: 19.7%
pH: 4.3
Particle size (PSDA, volume median): 213 nm

Dispersion CV1

The initial charge, consisting of 458 g of water and 154.5 g of dispersion BV1, in a polymerization vessel equipped with an anchor stirrer, reflux condenser and two feed vessels was heated in a nitrogen atmosphere to a temperature of 82° C. and, following admixture of 12.8 g of a 2.5% sodium peroxodisulfate solution, incipiently polymerized for 5 min. Then pre-emulsion 1 (consisting of 159 g of water, 6.7 g of Disponil® LDBS 20, 9.8 g of methacrylic acid and 156 g of styrene) was added over 90 min at 82° C. together with 16.8 g of a 2.5% sodium peroxodisulfate solution. On completion of the two additions the internal temperature was raised to 92° C. over 30 min and then pre-emulsion 2 (consisting of 14 g of water, 0.5 g of arylsulfonate (15% strength) and 13.6 g of α-methylstyrene) was added and stirred for 5 min before the admixture of 26 g of 10% strength ammonia-water; the reaction mixture was stirred at 92° C. for a further 15 min. Thereafter 3.6 g of a 2.5% sodium peroxodisulfate solution were added over 3 min. Pre-emulsion 3 (consisting of 157 g of water, 5.9 g of Disponil® LDBS 20, 0.2 g of methacrylic acid, 20 g of divinylbenzene and 198 g of styrene) was added over 100 min at 92° C. together with 23.7 g of a 2.5% sodium peroxodisulfate solution. The system was finally postpolymerized for a further 30 min. To reduce residual monomers, a chemical deodorization was additionally carried out as a final step. To this end, 12.0 g of a 10% strength tert-butyl hydroperoxide solution and also 12.0 g of a 10% strength ascorbic acid solution were added concurrently to the reaction mixture over 60 min at 92° C.

Solids content: 29.3%
pH: 8.6
Particle size (PSDA, volume median): 480 nm
Whiteness: 76
Internal water: 14%

Example 3

Seed Dispersion A2:
A pre-emulsion was prepared from 123.85 g of water, 0.35 g of Disponil® FES 993, 182 g of n-butyl acrylate, 163.45 g of methyl methacrylate and 4.55 g of methacrylic acid. The initial charge, consisting of 1190.9 g of water, 24.97 g of Disponil® FES 993 and also 22.19 g of the pre-emulsion, in a polymerization vessel equipped with an anchor stirrer, a reflux condenser and two feed vessels was heated in a nitrogen atmosphere to a temperature of 80° C. and incipiently polymerized for 15 min by addition of 67.2 g of a 2.5 wt % sodium peroxodisulfate solution. Thereafter, the rest of the pre-emulsion was metered in at 80° C. over 60 min. This was followed by further polymerization for 15 min and cooling down to 55° C. over 20 min. To deplete the residual monomers, 3.5 g of a 10 wt % aqueous tert-butyl hydroperoxide solution and also 2.19 g of a 10 wt % aqueous Rongalit C® solution were then added to the reaction mixture, which was stirred for one hour and then cooled down to 30° C., at which point 4.38 g of 25 wt % aqueous ammonia solution were added to adjust the pH of the dispersion.

Solids content: 19.9%
Particle size (PSDA, volume median): 50 nm

Dispersion B3 (Swell-Core)
The initial charge, consisting of 1822.6 g of water and 169 g of seed dispersion A2, in a polymerization vessel equipped with an anchor stirrer, reflux condenser and two feed vessels was heated in a nitrogen atmosphere to a temperature of 82° C. Two minutes after addition of 26.68 g of a 7 wt % sodium peroxodisulfate solution, a mixture of 0.62 g of allyl methacrylate and 217.34 g of methyl methacrylate and a solution of 9.34 g of Lutensit® A-EP A, 9.34 g of Disponil® LDBS 20 and 166 g of methacrylic acid in 562 g of water were added concurrently over 90 min. Ten minutes after completion of the addition, 92.55 g of a 1.5 wt % sodium peroxodisulfate solution, a mixture of 62 g of n-butyl methacrylate and 345.86 g of methyl methacrylate and also a solution of 2.49 g of Disponil® LDBS 20 and 8.38 g of methacrylic acid in 276.89 g of water were added concurrently over 75 min. Finally, the feed vessel was rinsed with 33 g of water and polymerization was continued for a further 30 min.

Solids content: 21.9%
pH: 3.5
Particle size (PSDA, volume median): 190 nm

Dispersion C2
The initial charge, consisting of 261 g of water and 273.21 g of dispersion B3, in a polymerization vessel equipped with an anchor stirrer, a reflux condenser and two feed vessels was heated in a nitrogen atmosphere to a temperature of 81° C. Addition of 25.2 g of a 1.4 wt % sodium peroxodisulfate solution was followed by the metered addition over 120 min of pre-emulsion 1, consisting of 132 g of water, 13.6 g of Disponil® LDBS 20, 4.08 g of methacrylic acid, 17.2 g of methyl methacrylate, 10.88 g of acrylonitrile, 3.4 g of allyl methacrylate and 202.84 g of styrene, together with 24.32 g of a 2.5 wt % sodium peroxodisulfate solution. On completion of the additions, 3.36 g of a 2.5 wt % sodium peroxodisulfate solution were added and the internal temperature was raised to 92° C. over 40 min. Then, 23.76 g of α-methylstyrene were added over 10 min and the feed rinsed with 40.5 g of water. After a further 20 min of stirring 32 g of a 10 wt % ammonia solution were metered in over 5 min and stirred in for 5 min. This was followed by the metered addition within 15 min of pre-emulsion 2, consisting of 98.44 g of water, 7 g of Disponil® LDBS 20, 0.28 g of methacrylic acid and 78 g of divinylbenzene. Completion of the addition was followed five minutes later by the addition of 5.64 g of a 10 wt % aqueous solution of tert-butyl hydroperoxide and the metering over 20 min of 31 g of a 3 wt % aqueous Rongalit C® solution. 30 minutes after completion of the addition a further 9.16 g of a 10 wt % aqueous solution of tert-butyl hydroperoxide and 8.52 g of a 5.1 wt % aqueous Rongalit C® solution were added concurrently by metered addition over 60 min.

Solids content: 29.7%
pH: 9.5
Particle size (PSDA, volume median): 394 nm
Whiteness: 80
Internal water: 25%

Example 4

Seed Dispersion:
Similar to Example 3
Dispersion (Swell-Core)
Similar to Example 3
Dispersion C4
The initial charge, consisting of 261 g of water and 273.21 g of dispersion B3, in a polymerization vessel equipped with an anchor stirrer, a reflux condenser and two feed vessels was heated in a nitrogen atmosphere to a temperature of 81° C. Addition of 25.2 g of a 1.4 wt % sodium peroxodisulfate solution was followed by the metered addition over 120 min of pre-emulsion 1, consisting of 132 g of water, 13.6 g of Disponil® LDBS 20, 4.08 g of methacrylic acid, 17.2 g of methyl methacrylate, 3.4 g of allyl methacrylate and 213.72 g of styrene, together with 24.32 g of a 2.5 wt % sodium peroxodisulfate solution. On completion of the additions, 3.36 g of a 2.5 wt % sodium peroxodisulfate solution were added and the internal temperature was raised to 92° C. over 40 min. Then, 23.76 g of α-methylstyrene were added over 10 min and the feed rinsed with 40.5 g of water. After a further 20 min of stirring 32 g of a 10 wt % ammonia solution were metered in over 5 min and stirred in for 5 min. This was followed by the metered addition within 15 min of pre-emulsion 2, consisting of 98.44 g of water, 7 g of Disponil® LDBS 20, 0.28 g of methacrylic acid and 78 g of divinylbenzene. Completion of the addition was followed five minutes later by the addition of 5.64 g of a 10 wt % aqueous solution of tert-butyl hydroperoxide and the metering over 20 min of 31 g of a 3 wt % aqueous Rongalit C® solution. 30 minutes after completion of the addition a further 9.16 g of a 10 wt % aqueous solution of tert-butyl hydroperoxide 8.52 g of a 5.1 wt % aqueous Rongalit C® solution were added concurrently by metered addition over 60 min.

Solids content: 29.7%
pH: 9.5
Particle size (PSDA, volume median): 390 nm
Whiteness: 80
Internal water: 25%

Example 5

Similar to Example 3
Dispersion (Swell-Core)
Similar to Example 3
Dispersion C5

The initial charge, consisting of 261 g of water and 273.21 g of dispersion B3, in a polymerization vessel equipped with an anchor stirrer, a reflux condenser and two feed vessels was heated in a nitrogen atmosphere to a temperature of 81° C. Addition of 25.2 g of a 1.4 wt % sodium peroxodisulfate solution was followed by the metered addition over 120 min of pre-emulsion 1, consisting of 102 g of water, 13.6 g of Disponil® LDBS 20, 2 g of linseed oil fatty acids, 17.2 g of methyl methacrylate, 3.4 g of allyl methacrylate and 217.8 g of styrene, together with 24.32 g of a 2.5 wt % sodium peroxodisulfate solution. On completion of the additions, 3.36 g of a 2.5 wt % sodium peroxodisulfate solution were added and the internal temperature was raised to 92° C. over 40 min. Then, 23.76 g of α-methylstyrene were added over 10 min. After a further 20 min of stirring 219.28 g of a 3 wt % sodium hydroxide solution were metered in over 20 min and stirred in for 5 min. This was followed by the metered addition within 15 min of pre-emulsion 2, consisting of 40.44 g of water, 7 g of Disponil® LDBS 20, 0.28 g of methacrylic acid and 78 g of divinylbenzene. Completion of the addition was followed five minutes later by the addition of 5.64 g of a 10 wt % aqueous solution of tert-butyl hydroperoxide and the metering over 20 min of 31 g of a 3 wt % aqueous Rongalit C solution. 30 minutes after completion of the addition a further 9.16 g of a 10 wt % aqueous solution of tert-butyl hydroperoxide and 8.52 g of a 5.1 wt % aqueous Rongalit C® solution were added concurrently by metered addition over 60 min.

Solids content: 30%
pH: 8.3
Particle size (PSDA, volume median): 400 nm
Whiteness: 79
Internal water: 24%

Example 6

Seed Dispersion:
Similar to Example 3
Dispersion (Swell-Core)
Similar to Example 3
Dispersion C6

The initial charge, consisting of 261 g of water and 273.21 g of dispersion B3, in a polymerization vessel equipped with an anchor stirrer, a reflux condenser and two feed vessels was heated in a nitrogen atmosphere to a temperature of 81° C. Addition of 25.2 g of a 1.4 wt % sodium peroxodisulfate solution was followed by the metered addition over 120 min of pre-emulsion 1, consisting of 102 g of water, 13.6 g of Disponil® LDBS 20, 2 g of linseed oil fatty acids, 17.2 g of methyl methacrylate, 3.4 g of allyl methacrylate and 217.8 g of styrene, together with 24.32 g of a 2.5 wt % sodium peroxodisulfate solution. On completion of the additions, 3.36 g of a 2.5 wt % sodium peroxodisulfate solution were added and the internal temperature was raised to 92° C. over 40 min. Then, 23.76 g of α-methylstyrene were added over 10 min. After a further 20 min of stirring 243.64 g of a 6 wt % sodium hydrogen carbonate solution were metered in over 20 min and stirred in for 5 min. This was followed by the metered addition within 15 min of pre-emulsion 2, consisting of 40 g of water, 7 g of Disponil® LDBS 20, 0.28 g of methacrylic acid and 78 g of divinylbenzene. Completion of the addition was followed five minutes later by the addition of 5.64 g of a 10 wt % aqueous solution of tert-butyl hydroperoxide and the metering over 20 min of 31 g of a 3 wt % aqueous Rongalit C® solution. 30 minutes after completion of the addition a further 9.16 g of a 10 wt % aqueous solution of tert-butyl hydroperoxide and 8.52 g of a 5.1 wt % aqueous Rongalit C® solution were added concurrently by metered addition over 60 min.

Solids content: 30%
pH: 7.5
Particle size (PSDA, volume median): 385 nm
Whiteness: 79
Internal water: 24%

Example 7

Seed Dispersion:
Similar to Example 3
Dispersion (Swell-Core) B4

The initial charge, consisting of 1958.8 g of water and 14.54 g of seed dispersion A2, in a polymerization vessel equipped with an anchor stirrer, reflux condenser and two feed vessels was heated in a nitrogen atmosphere to a temperature of 82° C. Two minutes after addition of 26.68 g of a 7 wt % sodium peroxodisulfate solution, 217.96 g of methyl methacrylate and a solution of 9.34 g of Lutensit® A-EP A, 9.34 g of Disponil® LDBS 20 and 166 g of methacrylic acid in 562 g of water were added concurrently over 90 min. Ten minutes after completion of the addition, 92.55 g of a 1.5 wt % sodium peroxodisulfate solution, a mixture of 62 g of n-butyl methacrylate and 345.86 g of methyl methacrylate and also a solution of 2.49 g of Disponil® LDBS 20 and 8.38 g of methacrylic acid in 276.89 g of water were added concurrently over 75 min. Finally, the feed vessel was rinsed with 33 g of water and polymerization was continued for a further 30 min.

Solids content: 22%
pH: 3.5
Particle size (PSDA, volume median): 185 nm
Dispersion C7

The initial charge, consisting of 261 g of water and 273.21 g of dispersion B4, in a polymerization vessel equipped with an anchor stirrer, a reflux condenser and two feed vessels was heated in a nitrogen atmosphere to a temperature of 81° C. Addition of 25.2 g of a 1.4 wt % sodium peroxodisulfate solution was followed by the metered addition over 120 min of pre-emulsion 1, consisting of 132 g of water, 13.6 g of Disponil® LDBS 20, 2 g of linseed oil fatty acids, 17.2 g of methyl methacrylate, 3.4 g of allyl methacrylate and 217.8 g of styrene, together with 24.32 g of a 2.5 wt % sodium peroxodisulfate solution. On completion of the additions, 3.36 g of a 2.5 wt % sodium peroxodisulfate solution were added and the internal temperature was raised to 92° C. over 40 min. Then, 23.76 g of α-methylstyrene were added over 10 min and the feed rinsed with 40.5 g of water. After a further 20 min of stirring 32 g of a 10 wt % ammonia solution were metered in over 5 min and stirred in for 5 min. This was followed by the metered addition within 15 min of pre-emulsion 2, consisting of 98.44 g of water, 7 g of Disponil® LDBS 20, 0.28 g of methacrylic acid and 78 g of divinylbenzene. Completion of the addition was followed five minutes later by the addition of 5.64 g of a 10 wt % aqueous solution of tert-butyl hydroperoxide and the metering over 20 min of 31 g of a 3 wt % aqueous Rongalit C® solution. 30 minutes after completion of the addition a further 9.16 g of a 10 wt % aqueous solution of tert-butyl hydroperoxide and 8.52 g of a 5.1 wt % aqueous Rongalit C® solution were added concurrently by metered addition over 60 min.

Solids content: 30%
pH: 7.5
Particle size (PSDA, volume median): 385 nm
Whiteness: 79
Internal water: 24%

Example 8

Seed Dispersion:
Similar to Example 1
Dispersion (Swell-Core) B5
The initial charge, consisting of 1958.8 g of water and 14.54 g of seed dispersion A1, in a polymerization vessel equipped with an anchor stirrer, reflux condenser and two feed vessels was heated in a nitrogen atmosphere to a temperature of 82° C. Two minutes after addition of 26.68 g of a 7 wt % sodium peroxodisulfate solution, a mixture of 3.84 g of 2-ethylhexyl thioglycolate and 217.34 g of methyl methacrylate and a solution of 9.34 g of Lutensit® A-EP A, 9.34 g of Disponil® LDBS 20 and 166 g of methacrylic acid in 562 g of water were added concurrently over 90 min. Ten minutes after completion of the addition, 92.55 g of a 1.5 wt % sodium peroxodisulfate solution, a mixture of 62 g of n-butyl methacrylate and 345.86 g of methyl methacrylate and also a solution of 2.49 g of Disponil® LDBS 20 and 8.38 g of methacrylic acid in 276.89 g of water were added concurrently over 75 min. Finally, the feed vessel was rinsed with 33 g of water and polymerization was continued for a further 30 min.

Solids content: 21.9%
pH: 3.7
Particle size (PSDA, volume median): 187 nm
Dispersion C8
The initial charge, consisting of 261 g of water and 273.21 g of dispersion B5, in a polymerization vessel equipped with an anchor stirrer, a reflux condenser and two feed vessels was heated in a nitrogen atmosphere to a temperature of 81° C. Addition of 25.2 g of a 1.4 wt % sodium peroxodisulfate solution was followed by the metered addition over 120 min of pre-emulsion 1, consisting of 132 g of water, 13.6 g of Disponil® LDBS 20, 2 g of linseed oil fatty acids, 17.2 g of methyl methacrylate, 3.4 g of allyl methacrylate and 217.8 g of styrene, together with 24.32 g of a 2.5 wt % sodium peroxodisulfate solution. On completion of the additions, 3.36 g of a 2.5 wt % sodium peroxodisulfate solution were added and the internal temperature was raised to 92° C. over 40 min. Then, 23.76 g of α-methylstyrene were added over 10 min and the feed rinsed with 40.5 g of water. After a further 20 min of stirring 32 g of a 10 wt % ammonia solution were metered in over 5 min and stirred in for 5 min. This was followed by the metered addition within 15 min of pre-emulsion 2, consisting of 98.44 g of water, 7 g of Disponil® LDBS 20, 0.28 g of methacrylic acid and 78 g of divinylbenzene. Completion of the addition was followed five minutes later by the addition of 5.64 g of a 10 wt % aqueous solution of tert-butyl hydroperoxide and the metering over 20 min of 31 g of a 3 wt % aqueous Rongalit C® solution. 30 minutes after completion of the addition a further 9.16 g of a 10 wt % aqueous solution of tert-butyl hydroperoxide and 8.52 g of a 5.1 wt % aqueous Rongalit C® solution were added concurrently by metered addition over 60 min.

Solids content: 30%
pH: 7.5
Particle size (PSDA, volume median): 405 nm
Whiteness: 80
Internal water: 26%

Example 9

Dispersion (Swell-Core) B6
The initial charge, consisting of 521 g of water and 1.64 g of Disponil® FES 993, in a polymerization vessel equipped with an anchor stirrer, a reflux condenser and two feed vessels was heated in a nitrogen atmosphere to a temperature of 82° C. Then pre-emulsion 1 consisting of 15.19 g of water, 0.27 g of Disponil® FES 993, 27.88 g of methyl methacrylate and 0.33 g of methacrylic acid and 11.43 g of a 10 wt % sodium peroxodisulfate solution was added before polymerizing for 30 min during which the temperature within the polymerization vessel was adjusted to 85° C. Thereafter pre-emulsion 2, consisting of 485.67 g of water, 27.22 g of Disponil® FES 993, 334.22 g of methyl methacrylate, 9 g of allyl methacrylate and 228.82 g of methacrylic acid was added over 120 min at 85° C. Finally, the feed vessel was rinsed with 10 g of water and the system was postpolymerized for a further 15 min. Subsequently, 133.35 g of a 1.5 wt % sodium peroxodisulfate solution; a mixture of 89.33 g of n-butyl methacrylate and 489.33 g of methyl methacrylate; and also a solution of 3.59 g of Disponil® LDBS 20 and 12.07 g of methacrylic acid in 700 g of water; were added concurrently over 75 min. Finally the feed vessel was rinsed with 48 g of water and the system was postpolymerized for a further 30 min.

Solids content: 33.1%
pH: 3.7
Particle size (PSDA, volume median): 189 nm
Dispersion C9
The initial charge, consisting of 354.16 g of water and 179.94 g of dispersion B6, in a polymerization vessel equipped with an anchor stirrer, a reflux condenser and two feed vessels was heated in a nitrogen atmosphere to a temperature of 81° C. Addition of 25.2 g of a 1.4 wt % sodium peroxodisulfate solution was followed by the metered addition over 120 min of pre-emulsion 1, consisting of 132 g of water, 13.6 g of Disponil® LDBS 20, 2 g of linseed oil fatty acids, 10.88 g of acrylonitrile, 17.2 g of methyl methacrylate, 3.4 g of allyl methacrylate and 206.9 g of styrene, together with 24.32 g of a 2.5 wt % sodium peroxodisulfate solution. On completion of the additions, 3.36 g of a 2.5 wt % sodium peroxodisulfate solution were added and the internal temperature was raised to 92° C. over 40 min. Then, 23.76 g of α-methylstyrene were added over 10 min and the feed line rinsed with 40.5 g of water. After a further 20 min of stirring 32 g of a 10 wt % ammonia solution were metered in over 5 min and stirred in for 5 min. This was followed by the metered addition within 15 min of pre-emulsion 2, consisting of 98.44 g of water, 7 g of Disponil® LDBS 20, 0.28 g of methacrylic acid and 78 g of divinylbenzene. Five minutes on completion of the addition were followed by the addition of 5.64 g of a 10 wt % aqueous solution of tert-butyl hydroperoxide and the metering over 20 min of 31 g of a 3 wt % aqueous Rongalit C® solution. 30 minutes after completion of the addition a further 9.16 g of a 10 wt % aqueous solution of tert-butyl hydroperoxide and 8.52 g of a 5.1 wt % aqueous Rongalit C® solution were added concurrently by metered addition over 60 min.

Solids content: 29.8%
pH: 9.5
Particle size (PSDA, volume median): 398 nm
Whiteness: 80
Internal water: 25%

Example 10

Dispersion (Swell-Core) B7

The initial charge, consisting of 478.53 g of water, 1.64 g of Disponil® FES 993 and 13.27 of EFKA® 3031, in a polymerization vessel equipped with an anchor stirrer, a reflux condenser and two feed vessels was heated in a nitrogen atmosphere to a temperature of 82° C. Then pre-emulsion 1 consisting of 80.68 g of water, 0.27 g of Disponil® FES 993, 27.88 g of methyl methacrylate and 0.33 g of methacrylic acid and 15.88 g of a 7 wt % sodium peroxodisulfate solution was added before polymerizing for 30 min during which the temperature within the polymerization vessel was adjusted to 85° C. Thereafter pre-emulsion 2, consisting of 485.67 g of water, 27.22 g of Disponil® FES 993, 334.22 g of methyl methacrylate, 9.00 g of allyl methacrylate and 228.82 g of methacrylic acid was added over 120 min at 85° C. Finally, the feed vessel was rinsed with 450.16 g of water and the system was postpolymerized for a further 15 min. Subsequently, 133.35 g of a 1.5 wt % sodium peroxodisulfate solution; a mixture of 89.33 g of n-butyl methacrylate and 489.33 g of methyl methacrylate; and also a solution of 3.59 g of Disponil® LDBS 20 and 12.07 g of methacrylic acid in 700 g of water; were added concurrently over 75 min. Finally the feed vessel was rinsed with 48 g of water and the system was postpolymerized for a further 30 min.

Solids content: 33.1%
pH: 2.9
Particle size (PSDA, volume median): 188 nm

Dispersion C10

The initial charge, consisting of 354 g of water and 175 g of dispersion B7, in a polymerization vessel equipped with an anchor stirrer, a reflux condenser and two feed vessels was heated in a nitrogen atmosphere to a temperature of 81° C. Addition of 25.2 g of a 1.4 wt % sodium peroxodisulfate solution was followed by the metered addition over 120 min of pre-emulsion 1, consisting of 102 g of water, 13.6 g of Disponil® LDBS 20, 2 g of linseed oil fatty acids, 17.2 g of methyl methacrylate, 3.4 g of allyl methacrylate and 217.8 g of styrene, together with 24.32 g of a 2.5 wt % sodium peroxodisulfate solution. On completion of the metered additions 3.36 g of a 2.5 wt % sodium peroxodisulfate solution was added and the internal temperature was raised to 92° C. over 40 min. Then 23.76 g of α-methylstyrene were added over 10 min. After a further 20 min of stirring, 243.64 g of a 2.8 wt % sodium hydroxide solution were metered in over 20 min and stirred in for 60 min. This was followed by the metered addition within 15 min of pre-emulsion 2, consisting of 40 g of water, 7 g of Disponil® LDBS 20, 0.28 g of methacrylic acid and 7.8 g of styrene. Completion of the addition was followed five minutes later by the addition of 5.64 g of a 10 wt % aqueous solution of tert-butyl hydroperoxide and the metering over 20 min of 31 g of a 3 wt % aqueous Rongalit C® solution. 30 minutes after completion of the addition a further 9.16 g of a 10 wt % aqueous solution of tert-butyl hydroperoxide and 8.52 g of a 5.1 wt % aqueous Rongalit C® solution were added concurrently by metered addition over 60 min.

Solids content: 29.5%
pH: 8.6
Particle size (PSDA, volume median): 398 nm.
Whiteness: 80
Internal water: 25%.

We claim:

1. A process for producing emulsion polymer particles, the process comprising polymerizing in a sequential polymerization:
   i) a seed polymer, and
   ii) then reacting with a swell-seed comprising 55 to 99.9 wt % of at least one nonionic ethylenically unsaturated monomer and 0.1 to 45 wt % of at least one ethylenically unsaturated hydrophilic monomer, based on an overall weight of a core stage polymer comprising the seed polymer and the swell-seed,
   iii) then polymerizing a first shell comprising 85 to 99.9 wt % of at least one nonionic ethylenically unsaturated monomer and 0.1 to 15 wt % of at least one hydrophilic ethylenically unsaturated monomer,
   iv) then polymerizing a second shell comprising 85 to 99.9 wt % of at least one nonionic ethylenically unsaturated monomer and 0.1 to 15 wt % of at least one hydrophilic ethylenically unsaturated monomer,
   v) then adding at least one plasticizer monomer having a ceiling temperature below 181° C.,
   vi) neutralizing, to a pH of not less than 7.5, resultant particles with one or more bases,
   vii) then polymerizing a third shell comprising 90 to 99.9 wt % of at least one nonionic ethylenically unsaturated monomer and 0.1 to 10 wt % of at least one hydrophilic ethylenically unsaturated monomer, and
   viii) optionally polymerizing one or more further shells comprising at least one nonionic ethylenically unsaturated monomer and at least one hydrophilic ethylenically unsaturated monomer,
   wherein:
   a weight ratio of the swell-seed (ii) to the seed polymer (i) ranges from 10:1 to 150:1;
   a weight ratio of the core stage polymer to the first shell (iii) ranges from 2:1 to 1:5; and
   a weight ratio of the third shell (vii) to the second shell (iv) ranges from 1:3 to 1:10.

2. The process according to claim 1, wherein an average particle size in an unswollen state of the core stage polymer of the seed polymer (i) and the swell-seed (ii) ranges from 50 to 300 nm.

3. The process according to claim 1, wherein in a protonated state a glass transition temperature, determined by a Fox equation, of the core stage polymer is between −20° C. and 150° C.

4. The process according to claim 1, wherein the first shell (iii) in a protonated state has a glass transition temperature determined by a Fox equation between −60° C. and 120° C.

5. The process according to claim 1, wherein a particle size of stage (iii) in an unswollen state is from 60 nm to 500 nm.

6. The process according to claim 1, wherein the second shell (iv) in a protonated state has a Fox glass transition temperature of 50 to 120° C.

7. The process according to claim 1, wherein an average particle size of stage (iv) ranges from 70 to 1000 nm.

8. The process according to claim 1, wherein the plasticizer monomer (v) is selected from the group consisting of α-methylstyrene, an ester of 2-phenylacrylic acid, 2-methyl-2-butene, 2,3-dimethyl-2-butene, 1,1-diphenylethene and methyl 2-tert-butylacrylate.

9. The process according to claim 1, wherein the bases (vi) are selected from the group consisting of an alkali metal compound, an alkaline earth metal compound, ammonia, a primary amine, a secondary amine, and a tertiary amine.

10. The process according to claim 1, wherein the third shell (vii) in a protonated state has a Fox glass transition temperature of 50 to 120° C.

11. The process according to claim 1, wherein the emulsion polymer particles have an internal water content of 20% to 40%, based on an entire water content of a dispersion of the emulsion polymer particles.

12. An emulsion polymer particle obtained by the process according to claim 1.

13. An emulsion polymer particle obtained by the process according to claim 1, which has an internal water content of 20% to 40%, based on an entire water content of a dispersion of the emulsion polymer particles.

14. An emulsion polymer particle obtained by the process according to claim 1, having a whiteness of ≥78.

15. A paint, comprising polymer particles obtained according to the process of claim 1.

16. The paint according to claim 15, wherein the whiteness of the polymer particles is ≥78.

* * * * *

UNITED STATES PATENT AND TRADEMARK OFFICE
CERTIFICATE OF CORRECTION

PATENT NO. : 10,000,600 B2
APPLICATION NO. : 14/913640
DATED : June 19, 2018
INVENTOR(S) : Daniel Kehrloesser et al.

It is certified that error appears in the above-identified patent and that said Letters Patent is hereby corrected as shown below:

In the Specification

Column 19, Line 3, "hydroperoxide 8.52 g of a 5.1 wt% aqueous Rongalit C®", should read -- hydroperoxide and 8.52 g of a 5.1 wt% aqueous Rongalit C® --

Signed and Sealed this
Fifth Day of May, 2020

Andrei Iancu
*Director of the United States Patent and Trademark Office*